(12) United States Patent
Schaeuble et al.

(10) Patent No.: US 9,714,007 B2
(45) Date of Patent: Jul. 25, 2017

(54) WIPER DEVICE FOR VEHICLE WINDOWS AND WIPER BLADE WITH A HEATING ARRANGEMENT

(75) Inventors: Michael Schaeuble, Vaihingen/Enz (DE); Frank Wondratschek, Stuttgart (DE); Bruno Egner-Walter, Heilbronn (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 148 days.

(21) Appl. No.: 13/521,764

(22) PCT Filed: Feb. 9, 2011

(86) PCT No.: PCT/EP2011/000595
§ 371 (c)(1),
(2), (4) Date: Jul. 12, 2012

(87) PCT Pub. No.: WO2011/098261
PCT Pub. Date: Aug. 18, 2011

(65) Prior Publication Data
US 2012/0291216 A1    Nov. 22, 2012

(30) Foreign Application Priority Data
Feb. 10, 2010   (DE) .................. 10 2010 007 557

(51) Int. Cl.
*B60S 1/38* (2006.01)
*B60S 1/52* (2006.01)

(52) U.S. Cl.
CPC ............ *B60S 1/3805* (2013.01); *B60S 1/524* (2013.01); *B60S 1/381* (2013.01); *B60S 1/3862* (2013.01);
(Continued)

(58) Field of Classification Search
CPC .... B60S 1/3803; B60S 1/3805; B60S 1/3862; B60S 1/487; B60S 1/488; B60S 1/524;
(Continued)

(56) References Cited

U.S. PATENT DOCUMENTS 2,648,865 A * 8/1953 Gordon et al. ............ 15/250.04
2,746,077 A   5/1956 Higgins
(Continued)

FOREIGN PATENT DOCUMENTS

CN          2405817 Y     11/2000
CN        201002587 Y      1/2008
(Continued)

OTHER PUBLICATIONS

DE102008027566 (machine translation), 2009.*
(Continued)

*Primary Examiner* — Andrew A Horton
(74) *Attorney, Agent, or Firm* — Osha Liang LLP (57) ABSTRACT

The invention relates to a wiper device (10) for vehicle windows, in particular for vehicle windscreens, with a wiper arm (11) which carries an adapter (16) on the wiper arm side, which is able to be connected with a wiper blade (20; 20*a*; 20*b*; 70) by means of an adapter element (18; 18*a*) on the wiper blade side, wherein the wiper blade (20; 20*a*; 20*b*; 70) has a wiper rubber (21) and at least one carrier rail (26, 27; 71) arranged in the longitudinal direction of the wiper blade (20; 20*a*; 20*b*; 70), which is arranged in operative connection with a heating arrangement (28; 28*a*; 72) having an electrical connection (46; 56, 57; 76). According to the invention, provision is made that the electrical connection (46; 56; 57; 76) of the heating arrangement (28; 28*a*; 72) is held in a sealing manner in a first plug connector body (48; 54, 55; 77).

14 Claims, 8 Drawing Sheets (52) U.S. Cl.
CPC ............ *B60S 1/3879* (2013.01); *B60S 1/3881* (2013.01); *B60S 1/3886* (2013.01)

(58) Field of Classification Search
CPC ............ B60S 2001/3843; B60S 1/3806; B60S 1/3801
USPC .......................................... 15/250.02–250.09
See application file for complete search history.

(56) References Cited

U.S. PATENT DOCUMENTS

| | | | | |
|---|---|---|---|---|
| 3,408,678 | A | * | 11/1968 | Linker ........................ 15/250.05 |
| 3,530,525 | A | * | 9/1970 | Abel Louis ................ 15/250.07 |
| 4,342,126 | A | * | 8/1982 | Neefeldt ............... B60S 1/3801 15/246 |
| 4,570,284 | A | * | 2/1986 | Verton .................. B60S 1/3806 15/250.201 |
| 5,558,792 | A | | 9/1996 | Gauharou |
| 6,591,443 | B1 | | 7/2003 | Gilpin |
| 2008/0256738 | A1 | * | 10/2008 | Malone ..................... 15/250.06 |
| 2009/0070952 | A1 | | 3/2009 | Peng |
| 2009/0100626 | A1 | * | 4/2009 | Kim .......................... 15/250.05 |
| 2011/0016653 | A1 | * | 1/2011 | Caillot et al. .............. 15/250.01 |
| 2011/0113580 | A1 | * | 5/2011 | Caillot et al. .............. 15/250.01 |
| 2011/0167577 | A1 | * | 7/2011 | Egner-Walter et al. ........ 15/105 |

FOREIGN PATENT DOCUMENTS

| | | | | |
|---|---|---|---|---|
| DE | 10039290 | A1 | 2/2002 | |
| DE | 10234267 | A1 | 2/2004 | |
| DE | 10 2008 027566 | A1 | 12/2009 | |
| DE | 102008049270 | A1 | 4/2010 | |
| DE | 10 2009 032375 | A1 | 1/2011 | |
| FR | 2744973 | A1 * | 8/1997 | ............ B60S 1/3801 |
| FR | 2933932 | A1 * | 1/2010 | ................ B60S 1/38 |
| WO | 2009/118286 | A1 | 10/2009 | |

OTHER PUBLICATIONS

WO2009118286 (machine translation), 2009.*
FR2744973A1 (machine translation), 1997.*
International Search Report from PCT/EP2011/000595 dated May 6, 2011 (3 pages).
Office Action in counterpart Chinese Patent Application No. 201180018374.0, issued Jul. 3, 2014 (20 pages).
Search Report in counterpart German Patent Application No. 102010007557.4, issued Nov. 22, 2010 (2 pages).

* cited by examiner

WIPER DEVICE FOR VEHICLE WINDOWS AND WIPER BLADE WITH A HEATING ARRANGEMENT

PRIOR ART

The invention relates to a wiper device for vehicle windows according to the introductory clause of claim 1 and a wiper blade with a heating arrangement.

Figure 5:
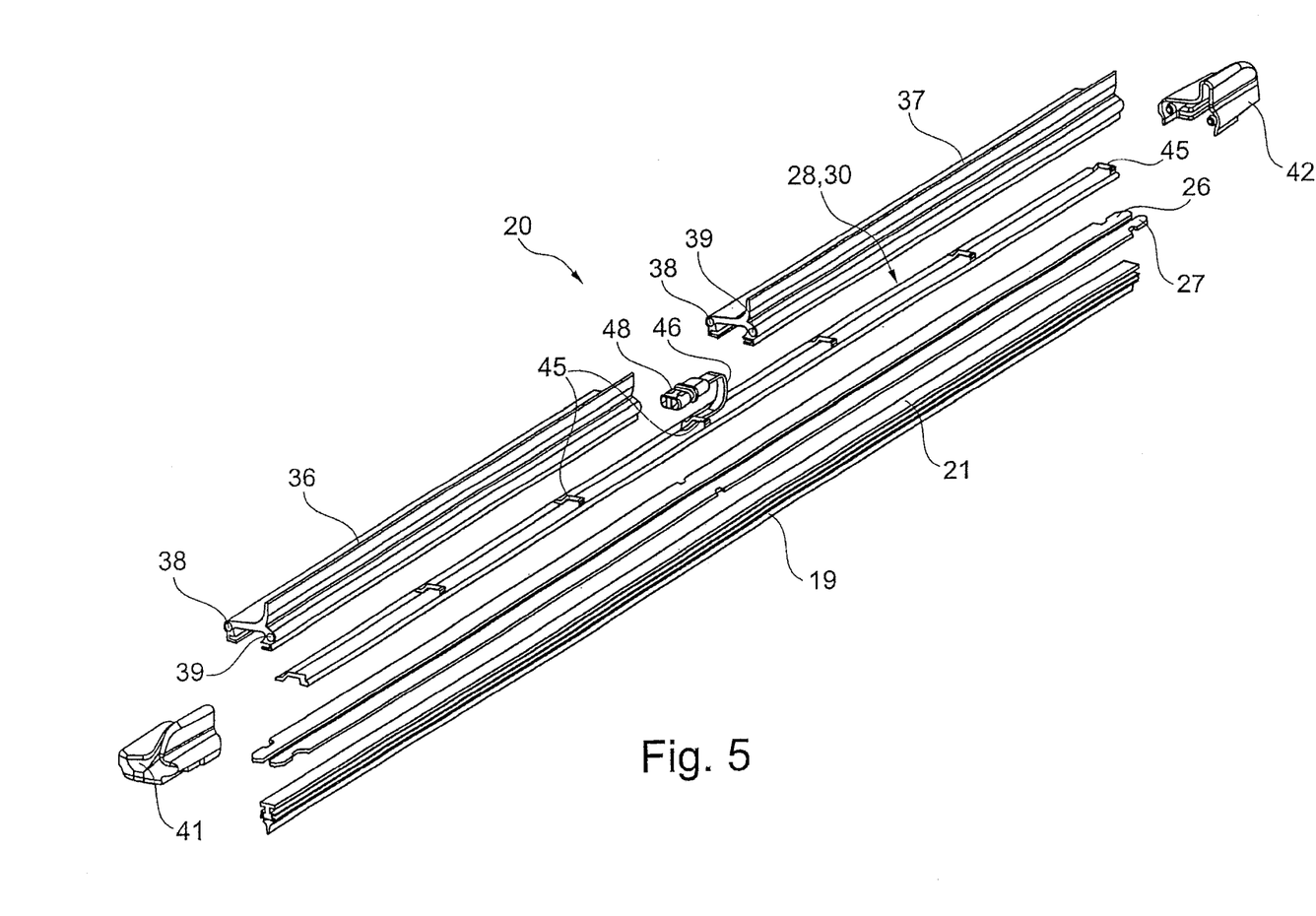

Such a wiper device is already known from DE 102 34 267 A1. In the known wiper device, a heating element having a round cross-section is proposed, which is arranged in abutting contact with a carrier rail of the wiper blade. Furthermore, it is known from the said document to provide a foil- or strip-like heating element which lies at least partially against a carrier rail, which in turn is encompassed by an adapter element (FIG. 5).

A problem in such wiper devices is, in particular, the electrical connecting of the heating elements to their current supply. For this, it is known from the applicant's subsequently published DE 10 2009 032 375 A1 in particular to connect a connection like a pin contact or in pin form directly with the heating conductor of a heating foil by means of a soldered or welded joint. The connection is able to be contacted with a connection socket to produce an electrical contact. The contact is protected from the penetration of moisture by means of a ring seal which is arranged between the connection and the connecting socket. Furthermore, it is known to realize the electrical contacting of the heating arrangement by means of resilient contacts. However, it has been found in practice that both the electrical contacts mentioned are critical with regard to the penetration or entry of moisture. Therefore, in both cases additional sealing measures are necessary in order to guarantee functioning over the necessary operating time.

DISCLOSURE OF THE INVENTION

Proceeding from the represented prior art, the invention is based on the problem of further developing a wiper device for vehicle windows according to the introductory clause of claim 1 such that a secure and reliable functioning of the heating arrangement is made possible over the entire operating time of the wiper device with relatively little expenditure. This problem is solved in a wiper device for vehicle windows having the features of claim 1. The invention is based here on the idea of preventing the entry of moisture or water by a sealed arrangement of the electrical connection of the heating arrangement by means of a plug connector body, and hence making possible a secure functioning of the wiper device.

Advantageous further developments of the wiper device for vehicle windows according to the invention are indicated in the subclaims. All combinations of at least two of features disclosed in the claims, the description and/or the figures fall here within the framework of the invention.

In a preferred embodiment of the invention, provision is made that the first plug connector body is able to be contacted electrically by means of a mating plug connector on the wiper arm side. Therefore, by the first plug connector body in connection with the mating plug connector, a protected arrangement of the electrical contacts is made possible.

This is made possible in particular by an integrated arrangement of the first plug connector in the adapter element. The first plug connector body is therefore surrounded by the adapter element, so that a particularly good sealing effect is achieved.

Quite particularly preferably, provision is made that the adapter element is covered by means of a section of the adapter at least in the region of the first plug connector body. Thereby, an additional protection or an additional sealing of the adapter element is made possible at least in the region of the electrical contacting of the heating arrangement.

In order to make possible as flat a wiper blade as possible, which is able to be heated over wide areas, provision is made in a further embodiment of the invention that the heating arrangement is constructed as a flexible heating foil which is arranged in abutting contact with the at least one carrier rail.

In particular, provision is made here that the heating foil is connected on the surface, in particular on the entire surface, with the at least one carrier rail, in particular by an adhesive layer on the heating foil. By a connection over the entire surface between the heating foil and the carrier rail, a particularly good heat transfer is achieved of the carrier rail, usually consisting of metal, wherein by the provision of the adhesive layer a simple, reliable method, suitable for serial production on an industrial scale, is presented for connecting the heating arrangement or the heating foil to the carrier rail.

In a further, particularly preferred embodiment of the invention, provision is made that the at least one carrier rail together with at least one partial area of the heating foil is held in a longitudinal recess of a wiper rubber. Such an arrangement makes possible in particular a protected mounting of the relatively sensitive heating foil in the wiper blade, wherein at the same time the entry of moisture in the region of the heating foil is made difficult. At the same time, a construction of the wiper blade, known per se from the prior art, which has groove-like recesses to receive the carrier rails in the wiper rubber is adopted, the said construction having proved to be successful in practice.

In order to make the entry of water into the region of the heating arrangement difficult during the wiper operation, provision is preferably made in addition that the heating foil is arranged on the side of the carrier rail facing away from the vehicle window. Such an arrangement has, moreover, the advantage that it makes possible a connection which is relatively short and is simple to realize between the heating arrangement and the first plug connector body.

It is particularly advantageous here if the first plug connector body is coupled electrically with the heating foil via a flexible connection. Thereby, a simple mounting of the first plug connector body in the adapter element is achieved. Furthermore, different embodiments and geometric relationships between the heating arrangement and the adapter can be realized in a simple manner.

A particularly economical and hence favourably priced construction of the heating arrangement, in which the latter has in addition a particularly reliable functioning, is achieved when the flexible connection is a section of the heating foil.

With the existence of two carrier rails, a particularly economical manufacture can be achieved if a strip-shaped section is provided for each carrier rail, with the sections being connected with each other by means of at least one connecting section, the at least one connecting section preferably being arranged transversely to the longitudinal direction of the sections and the sections together with the at least one connecting section and the flexible connection being separated out from a single-piece heating foil blank. By the at least one connecting section which positions the two sections of the heating arrangement with respect to each other, it is possible in a particularly simple manner to achieve a fully automated mounting or a fully automated arranging of the heating arrangement on the carrier elements, so that the manufacture can be formulated in a particularly economical manner.

Furthermore, it is also possible to provide the wiper device additionally with a window cleaning function. For this, provision is made that the wiper blade additionally has at least one spray channel for a wiper fluid, running in the longitudinal direction of the wiper blade, and that the wiper fluid is supplied to the wiper blade by means of at least one connection on the adapter element. Therefore, the adapter element serves not only to receive the electrical contact of the heating arrangement, but also serves as a connection for the feeding of the wiper fluid to the at least one spray channel running in the wiper blade.

The invention also leads to a wiper blade with a heating arrangement for a wiper device according to the invention. Such a wiper blade is constructed or provided here as a replacement part for the wiper device, which can be connected in a known manner, e.g. engaged, on an adapter of a wiper arm by means of an adapter element on the wiper blade side.

Further advantages, features and details of the invention will emerge from the following description of preferred example embodiments and with the aid of the drawings, which show in:

FIG. 2 a cross-section through a wiper blade of the wiper device according to FIG. 1 to illustrate the arrangement of the carrier rails and the heating foil of the heating arrangement, FIGS. 3 and 4 respectively modified cross-sections through the wiper blade according to FIG. 2 to represent different heating foil arrangements, FIG. 5 parts of the wiper blade, as it is used in a wiper device according to FIG. 1, in exploded illustration, FIG. 6 parts of the wiper blade of FIG. 5, together with an adapter element on the wiper blade side, which can be fastened on the wiper arm of the wiper device according to FIG. 1, in perspective view partially in section, FIG. 7 parts of a wiper blade in the region of a modified adapter element on the wiper blade side with a modified heating arrangement in perspective view, FIG. 8 the modified adapter element according to FIG. 7 with a mounted adapter cover in perspective view, FIG. 9 parts of a modified wiper blade using a single carrier rail with modified heating arrangement in exploded illustration and FIG. 10 the components of the modified wiper blade illustrated in FIG. 9, after the mounting thereof.

Identical components or components having an identical function are given the same reference numbers in the figures.

Figure 1:
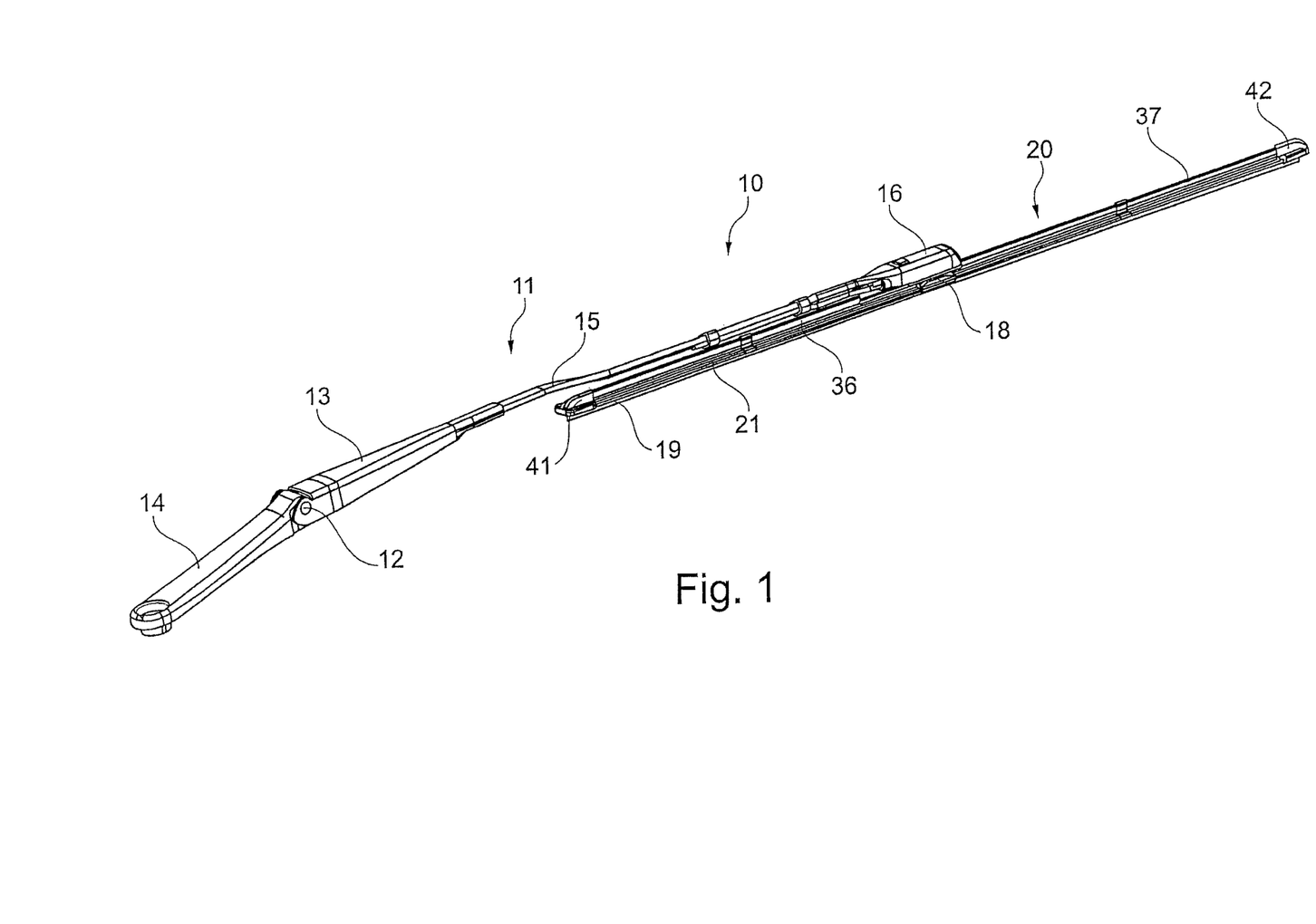
FIG. 1 a wiper device according to the invention in a perspective view.

In FIG. 1 a wiper device 10 is illustrated for vehicle windows, in particular for vehicle windscreens. The wiper device 10 has a wiper arm 11. The wiper arm 11 consists of a wiper rod 15, the articulation piece 13 of which is arranged so as to be pivotable by means of a wiper arm joint 12 on a bearing piece 14 of the wiper arm 11. The bearing piece 14 has a mounting, by which the wiper arm 11 is able to be fastened on a wiper shaft—which is not illustrated—of a wiper drive.

The wiper rod 15 has in addition, at its end facing away from the articulation piece 13, an adapter 16 on the wiper arm side. By means of the adapter 16, the wiper arm 11 can be detachably connected, in particular engaged, in a known manner with an adapter element 18. The adapter element 18 is a component part of a wiper blade 20.

Figures 2, 4:
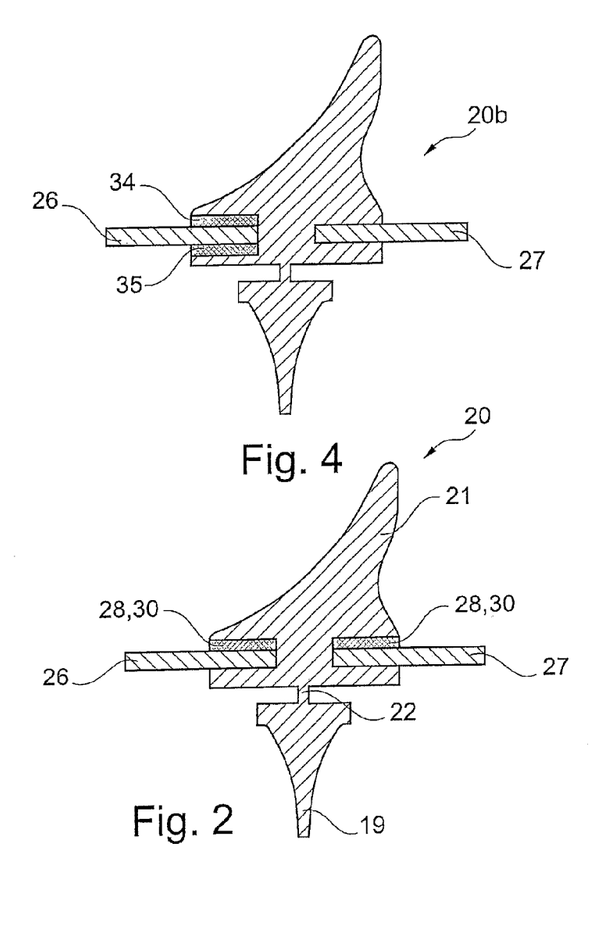

As can be seen in particular from viewing FIGS. 1 and 2 together, the wiper blade 20 has a wiper rubber 21. The wiper rubber 21 has a wiper lip 19 which is connected in one piece with the wiper rubber 20 via a tilting web 22 and lies against the vehicle window during wiper operation. In addition, the wiper blade 20 has, on opposite sides, two U-shaped recesses 23, 24 running in the longitudinal direction of the wiper blade 20. The two recesses 23, 24 serve for the form-fitting mounting respectively of a carrier rail 26, 27, produced in particular from spring steel, and of a heating arrangement in the form of a heating foil 30, which is to be described in more detail further below. Here, the sections of the heating foil 30 are arranged respectively on the side of the carrier rail 26, 27 facing away from the wiper lip 19 in the recesses 23, 24. The connecting of the heating arrangement 28 or the heating foil 30 with the carrier rails 26, 27 takes place in particular by a sticking of the heating foil 30 over the entire surface with the carrier rails 26, 27, for which the corresponding sections of the heating foil 30 are provided in particular with an adhesive layer.

In the first embodiment of the invention illustrated in FIG. 2, the heating foil 30 does not project beyond the recesses 23, 24 of the wiper rubber 21 or of the wiper blade 20.

Figure 3:
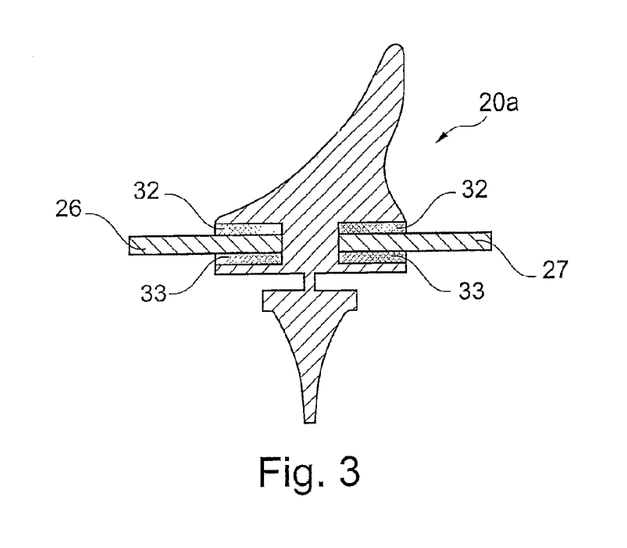

In FIGS. 3 and 4, cross-sections of modified wiper blades 20a or 20b are illustrated. Here, the wiper blade 20a according to FIG. 3 has two heating foils 32, 33, which are arranged on the upper side or on the underside of the carrier rails 26, 27. Also in this case, the heating foils 32, 33 do not project beyond the recesses 23, 24 of the wiper blade 20a. In contrast, in the case of the wiper blade 20b according to FIG. 4 provision is made that respectively a heating foil 34, 35 is arranged on the upper side or underside of the one carrier rail 26.

As an amendment to the wiper blades 20, 20a and 20b illustrated in FIGS. 2 to 4, it is also conceivable and possible to provide other arrangements of heating foils.

In particular, it is also conceivable that the corresponding heating foils 30, 32 to 35 project out from the recesses 23, 24 of the wiper blades 20, 20a and 20b, or else extend only over a partial region of the recesses 23, 24.

From viewing FIGS. 1 and 5 together, it can be seen that the wiper rubber 21 together with the carrier rails 26, 27 is surrounded on its upper side, facing away from the wiper lip 19, by two holding strips 36, 37, consisting in particular of plastic. Here, the adapter element 18 serves as a connection between the two carrier rails 36, 37, constructed in particular of approximately identical length, which are fastened at the end side on the corresponding side faces of the adapter element 18. In addition, spray channels 38, 39 can be seen, running in the longitudinal direction of the carrier rails 36, 37, which serve in a known manner for guiding or supplying a wiper fluid to the wiper blade 20. Here, nozzle openings which can not be seen in FIG. 5 open out in the spray channels 38, 39, by means of which nozzle openings the wiper fluid can be sprayed in front of the region of the wiper lip 19.

The wiper blade 20 is closed at its two end faces, lying opposite, by means of two closure pieces 41, 42. The spray channels 38, 39 in the holding strips 36, 37 are also closed or connected with each other by means of the closure pieces 41, 42.

In FIG. 5 the heating arrangement 28 or the heating foil can also be seen in detail. Here, two strip-shaped sections 43, 44 can be seen, which are arranged in heat-conducting abutting contact with the carrier tails 26, 27. The two sections 43, 44 are connected with each other by means of several—in the illustrated example embodiment by means of seven—connecting sections 45. The connecting sections 45 are preferably made here from the same material as the heating foil 30, which means that they are also flexible. In the illustrated example embodiment, the strip-shaped connecting sections 45 run perpendicularly to the longitudinal extent of the sections 43, 44. In particular, provision is made that the strip-shaped sections 43, 44 together with the connecting sections 45 are separated, out from a shared or from a single-piece blank of the heating foil 30, e.g. by a punching process or by means of a laser processing. The position of the two strip-shaped sections 43, 44 with respect to each other can be established by the connecting sections 45 or they can be aligned parallel to each other in order to thereby make possible an automatic mounting or positioning of the strip-shaped sections 43, 44 on the carrier rails 26, 27, or to basically simplify the mounting process.

The central of the, in all, seven connecting sections 45 serves at the same time for the electrical contacting of the heating foil 30. For this, a foil-like connection 46 arranged in one piece on the central connecting section 45 and able to be produced by a separating process from the blank of the heating foil 30 emerges from the central connecting section 45. The connection 46 is arranged here in particular centrally between the two sections 43, 44 and runs parallel to the latter.

A metallizing of the connection 46 of the heating foil 30, which is not illustrated, is connected with contact pins, which are not illustrated, for example by soldering or welding. Furthermore, with regard to a possible structure of the heating foil 30 and its connection with contact pins, reference is to be made to the subsequently published DE 10 2009 032 375 A1, which in this respect is to be a component part of this application. The contact pins serving as electrical connections of the heating foil 30 are again received in a first plug connector body 48 consisting of plastic and are able to be connected with the two poles of a direct current source, in particular the power supply of the motor vehicle. The current supply of the heating arrangement 28 or of the heating foil 30 is therefore ensured by means of the first plug connector body 48. It is also important that the entry region of the connection 46 into the first plug connector body 48 is protected against the entry of moisture, for example by a bonding or a sealing with an insulating compound.

Figure 6:
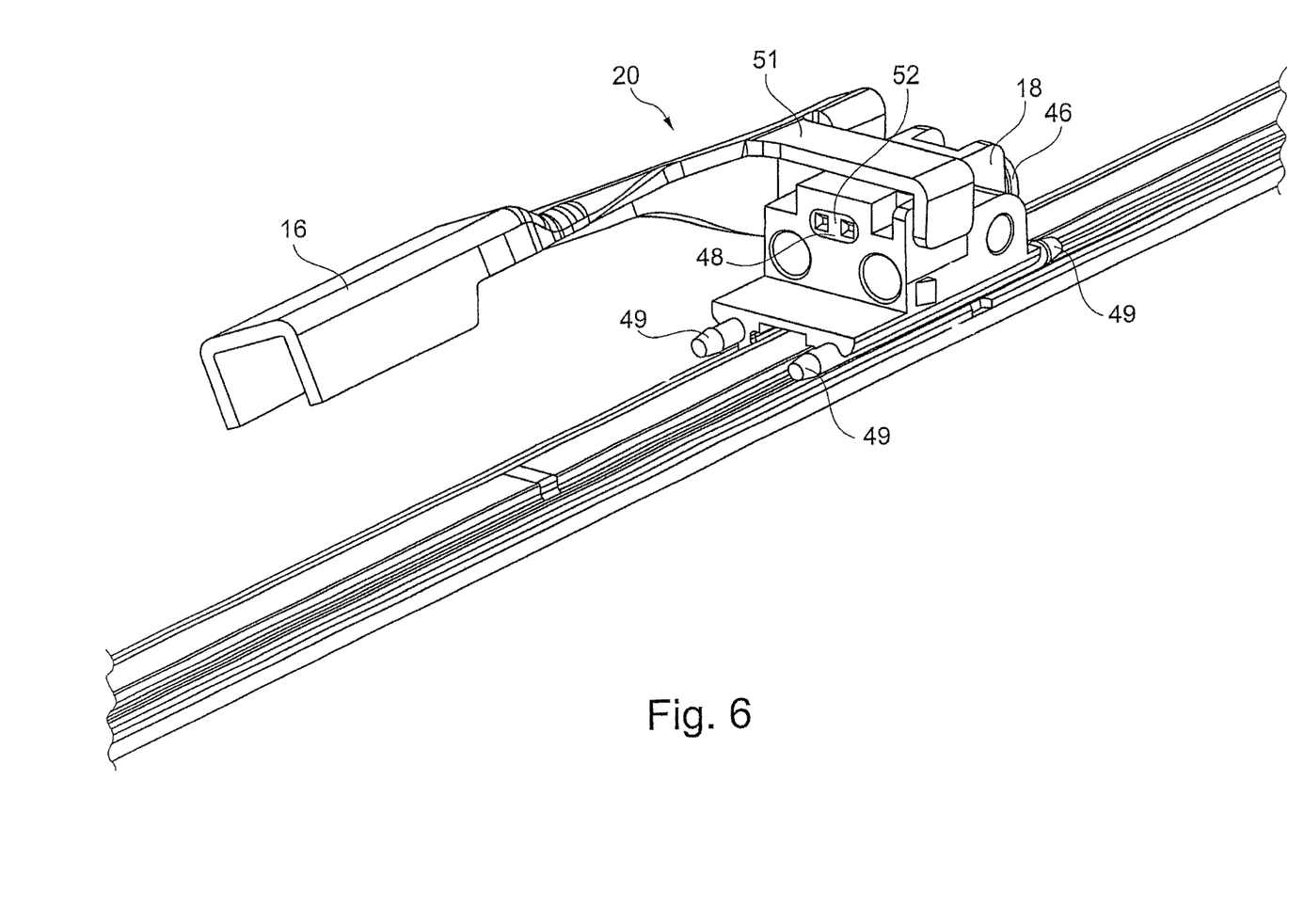

As can be seen in particular by means of FIG. 6, the first plug connector body 48 is arranged in the adapter element 18 of the wiper blade 20 or is surrounded by it. The arrangement here consists in particular in an engaging or clipping of the first plug connector body 48 in the adapter element 18. In addition, it can be seen that the adapter element 18 has connecting pieces 49 running in the longitudinal direction of the adapter element 18, which are able to be connected with the spray channels 38, 39 of the holding strips 36, 37 (the holding strips 36, 37 are not illustrated in FIG. 6) and which serve to supply the wiper fluid via the adapter element 18 into the holding strips 36, 37.

The adapter element 18 of the wiper arm 20 is fastened pivotably on the wiper rod 15 via a bracket- or cap-like section 51 of the adapter 16. It can be further seen by means of FIG. 6 that the connection 46 of the heating arrangement 28 is laid in a curved shape and runs at a distance from the rotation axis of the adapter element 18 on the wiper arm 11.

In FIG. 6 the one end face 52 of the first plug connector body 48 can be seen. The first plug connector body 48 is able to be contacted electrically by means of a second plug connector body which is not shown, which is arranged in particular in the adapter 16. On mounting of the wiper blade 20 with the adapter 16, the first plug connector body 48 of the adapter element 18 comes into electrical connection with the second plug connector body in the adapter 16. Here, the two plug connector bodies are constructed in particular as standard plug connector bodies with, if applicable, additional sealing measures (for example a sealing ring) against the entry of moisture, in order to also prevent the entry of moisture via the connecting region of the two plug connector bodies. In addition, the connecting region of the two plug connector bodies is further covered or protected by the section 51 of the adapter 16.

Figure 7:
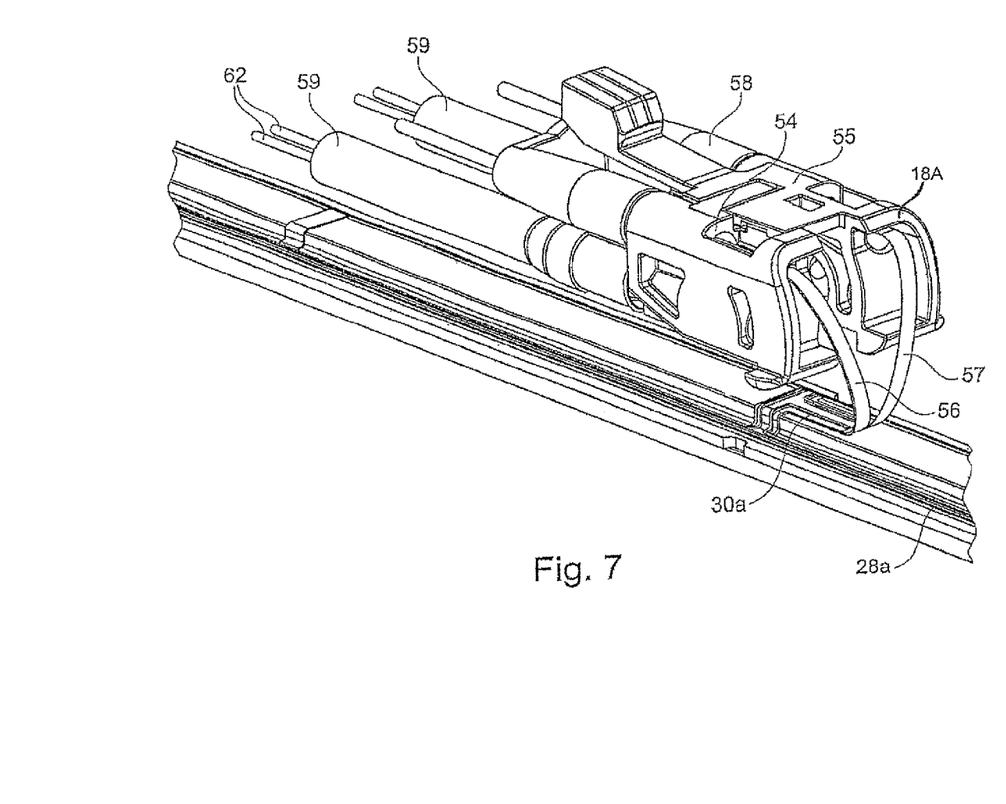
Figure 8:
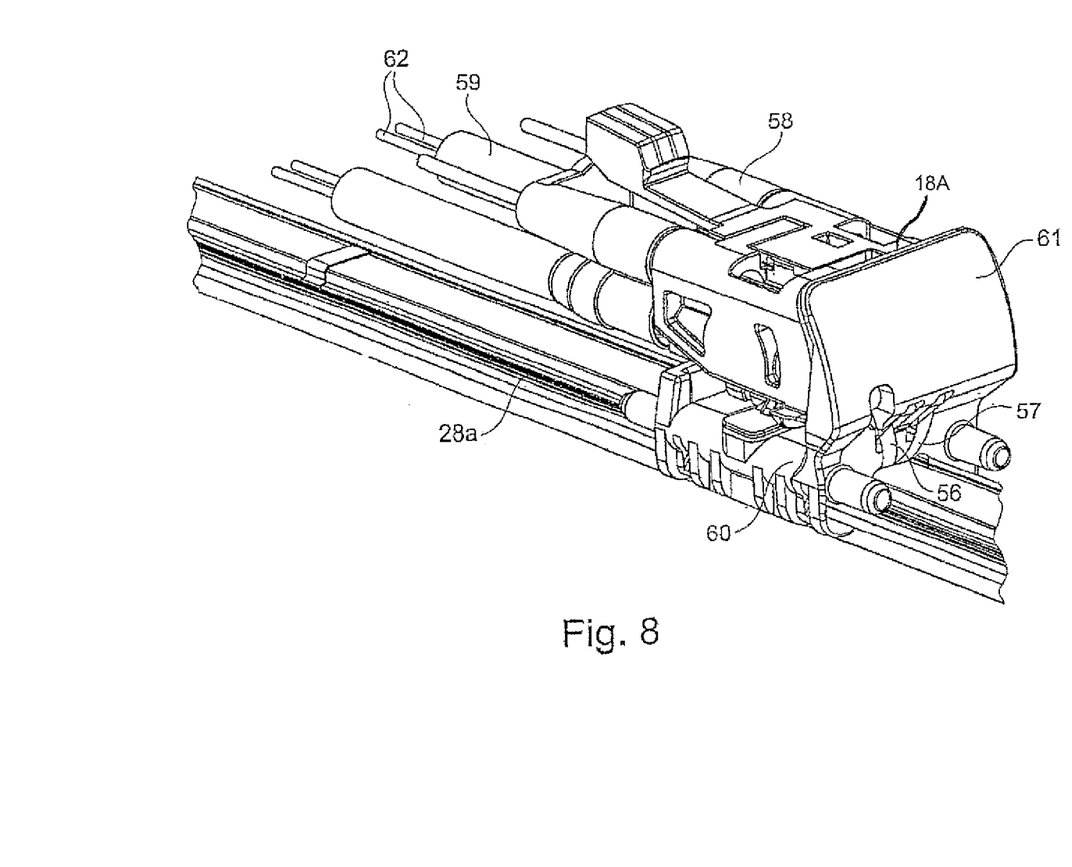

A modified adapter element 18a and a modified heating arrangement 28a are illustrated in FIGS. 7 and 8. Here, the electrical contacting of the heating arrangement 28a takes place by means of two first plug connector bodies 54, 55, which are separated from each other, which are held inside the adapter element 18a and are arranged parallel to each other. Here, the two first plug connector bodies 54, 55 in FIGS. 7 and 8 are covered by the adapter element 18a. Furthermore, each of the first plug connector bodies 54, 55 is provided with its own tongue-like connection 56, 57, which is likewise formed by a punching process from the heating foil 30a. The two first plug connector bodies 54, 55 are either electrically contacted respectively by means of a separate mating plug connector, or else by means of a shared mating plug connector 58, as illustrated.

Furthermore, in FIGS. 7 and 8 additional tubes 59 can be seen in FIGS. 7 and 8 for the supplying of the wiper fluid to the adapter element 18a, which are able to be heated by means of resistance wires 62 running inside the tubes 59, said wires also being supplied with power from the mating plug connector 58.

In FIG. 8 an adapter part element 60 can also be seen, which serves for connecting with the holding strips 36, 37, which are not illustrated, and which has a cap 61 which partially covers the region of the connections 56, 57.

Figure 9:
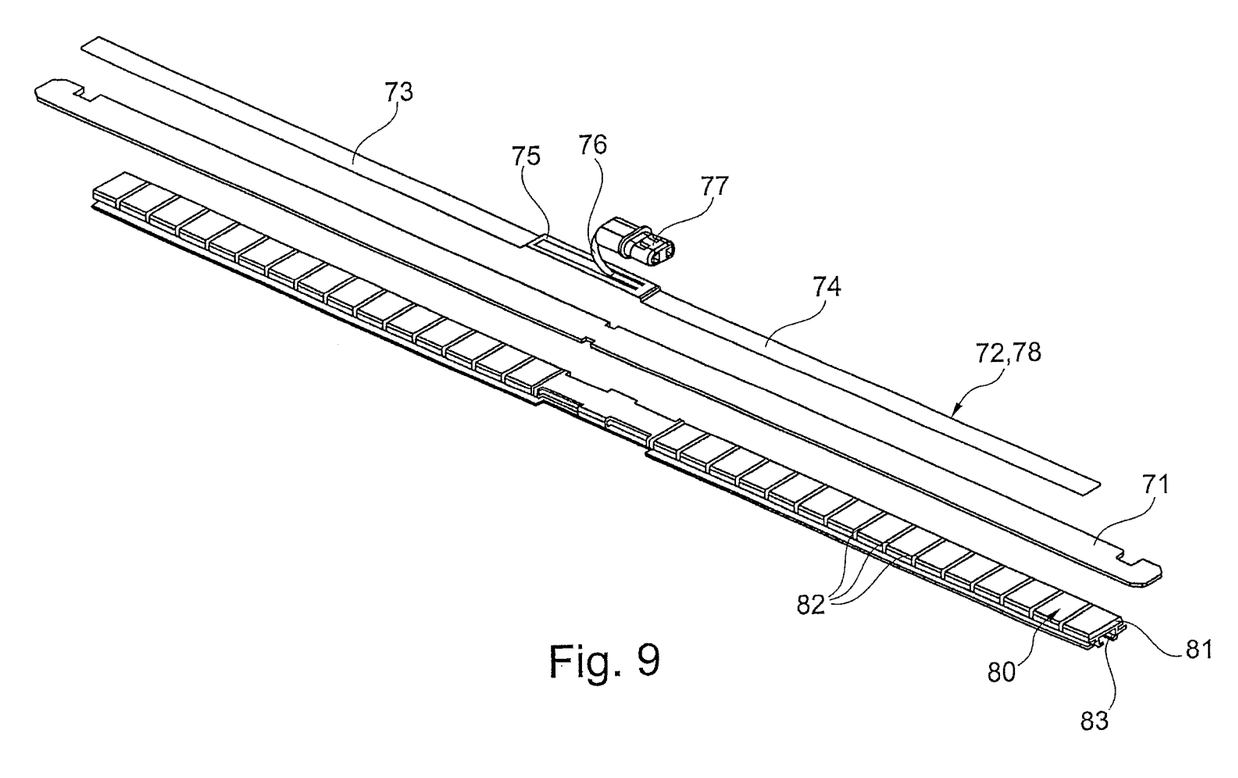
Figure 10:
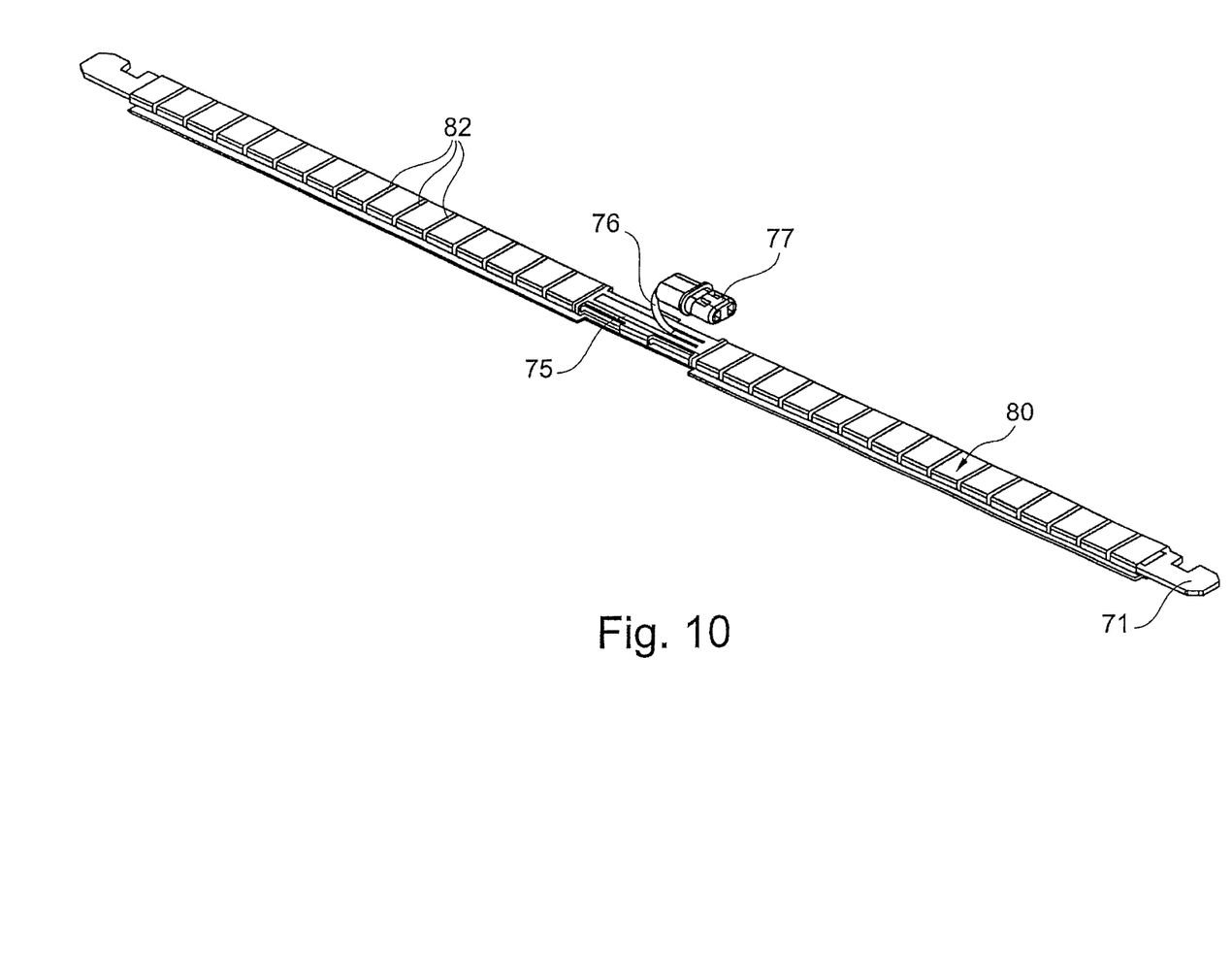

Parts of a modified wiper blade 70 using a single carrier rail 71 are illustrated in FIGS. 9 and 10. The heating arrangement 72 is likewise constructed using two strip-shaped sections 73, 74, which in particular are again connected in a heat-conducting manner on the entire surface with the upper side of the carrier rail 71. The electrical contacting area 75 of the heating arrangement 72 is formed between the two strip-shaped sections 73, 74. Here, a tongue-like connection 76 is provided, which is produced from the heating foil blank by a punching-out process or by another suitable processing, e.g. a laser processing. The connection 75 is connected with the first plug connector body 77. It is essential here that the sections 73, 74 together with the contacting area 75 and the connection 76 are able to be produced from a strip-shaped blank of the heating foil 78.

The carrier rail 71 is held together with the heating arrangement 72 in a holding strip 80. For this, the holding strip 80, which is produced in particular from plastic as an injection-moulded part, has a mounting 81 formed in the longitudinal direction of the holding strip 80. In addition, the holding strip 80 also has a plurality of transverse slits 82 running in transverse direction, which makes possible a flexibility of the holding strip 80 in longitudinal direction and hence an adaptation of the wiper blade 70 or its wiper rubber, which is not illustrated, to the contour of the curved vehicle window.

The holding strip 80 has in addition on the side facing away from the heating arrangement 72 a mounting groove 83 running in the longitudinal direction of the holding strip 80, by means of which the wiper rubber, which is not illustrated, is able to be connected with the holding strip 80.

LIST OF REFERENCE NUMBERS 10 wiper device
11 wiper arm
12 wiper arm joint
13 articulation piece
14 bearing piece
15 wiper rod
16 adapter
18/a adapter element
19 wiper lip
20/a/b wiper blade
21 wiper rubber
22 tilting web
23 recess
24 recess
26 carrier rail
27 carrier rail
28/a heating arrangement
30/a heating foil
32 heating foil
33 heating foil
34 heating foil
35 heating foil
36 holding strip
37 holding strip
38 spray channel
39 spray channel
41 closure piece
42 closure piece
43 strip-shaped section
44 strip-shaped section
45 connecting sections
46 connection
48 plug connector body
49 connecting piece
51 section
52 end face
54 plug connector body
55 plug connector body
56 connection
57 connection
58 mating plug connector
59 tube
60 adapter part element
61 cap
62 resistance wire
70 wiper blade
71 carrier rail
72 heating arrangement
73 strip-shaped section
74 strip-shaped section
75 contacting area
76 connection
77 plug connector body
78 heating foil
80 holding strip
81 mounting
82 transverse slit
83 mounting groove

The invention claimed is:

1. A wiper device, comprising:
a wiper arm that carries an adapter on a wiper arm side of the wiper arm;
a flat wiper blade that includes a wiper rubber and at least one carrier rail arranged in a longitudinal direction of the flat wiper blade, which is operatively connected to a heating arrangement having an electrical connection,
wherein the adapter is connected with the flat wiper blade using an adapter element on a flat wiper blade side of the wiper arm,
wherein the heating arrangement has:
at least one heating element arranged in heat-conducting abutting contact with the at least one carrier rail, and comprising strip-shaped sections extending through the blade and contacting the carrier rail and the adapter element
a connection element adapted to connect the heating element and serving as electrical connections of the heating element,
wherein one first end of the connection element is received in a first plug connector body,
wherein the first end of the connection element is sealed inside the first plug connector body,
wherein the first plug connector body is arranged entirely inside the adapter element on the flat wiper blade,
wherein the flat wiper blade further comprises a plurality of closure pieces that closes the flat wiper blade at opposite end faces of the flat wiper blade, and the closure pieces are separate constructional elements which are independent from each other.

2. The wiper device according to claim 1, wherein the first plug connector body is operatively connected to a mating plug connector on the wiper arm side.

3. The wiper device according to claim 2, the adapter element is covered by a section of the adapter at least in a region of the first plug connector body.

4. The wiper device according to claim 1, wherein the heating arrangement has a flexible heating foil, which is arranged in abutting contact with the at least one carrier rail.

5. The wiper device according to claim 4, wherein the heating foil is connected on the surface, in particular on an entire surface, with the at least one carrier rail, in particular by an adhesive layer on the heating foil.

6. The wiper device according to claim 4, wherein the at least one carrier rail together with at least one partial area of the heating foil is held in a longitudinal recess of the wiper rubber.

7. The wiper device according to claim 4, wherein a single carrier rail is provided, which is held in a mounting of a holding strip arranged in the longitudinal direction of the flat wiper blade, and wherein the holding strip, consisting of plastic, has on the side facing the vehicle window a mounting groove configured to receive the wiper rubber.

8. The wiper device according to claim 4, wherein the heating foil is arranged on a side of the at least one carrier rail facing away from the vehicle window.

9. The wiper device according to claim 4, wherein the electrical connection, which is connected with the first plug connector body, is flexible.

10. The wiper device according to claim 9, wherein the electrical connection is a section of the heating foil.

11. The wiper device according to claim 9, wherein, the at least one carrier rail comprises two carrier rails, one of the strip-shaped sections is provided for each carrier rail, wherein the strip-shaped sections are connected with each other by at least one connecting section, wherein the at least one connecting section is arranged transversely to a longitudinal direction of the strip-shaped sections, and wherein the strip-shaped sections together with the at least one connecting section and the electrical connection are separated out from a single-piece heating foil blank.

12. The wiper device according to claim 9, wherein the electrical connection is arranged in a curved shape on the adapter.

13. The wiper device according to claim 1, wherein the flat wiper blade has at least one spray channel running in the longitudinal direction of the flat wiper blade for a wiper fluid, and wherein the wiper fluid is supplied by at least one connection on the adapter element.

14. A flat wiper blade for a wiper device, the flat wiper blade comprising:
   a wiper rubber;
   at least one carrier rail arranged in a longitudinal direction of the flat wiper blade, which is operatively connected to a heating arrangement having an electrical connection; and
   a plurality of closure pieces that closes the flat wiper bade at opposite end faces of the flat wiper blade,
   wherein the wiper device includes a wiper arm that carries an adapter on a wiper arm side of the wiper arm,
   wherein the adapter is connected with the flat wiper blade using an adapter element on a flat wiper blade side of the wiper arm,
   wherein the heating arrangement has:
      at least one heating element arranged in beat-conducting abutting contact with the at least one carrier rail, and
      a connection element adapted to connect the heating element and serving as electrical connections of the heating element,
   wherein one first end of the connection element is received in a first plug connector body,
   wherein the first end of the connection element is sealed inside the first plug connector body,
   wherein the first plug connector body is arranged entirely inside the adapter element on the flat wiper blade,
   and the closure pieces are separate constructional elements which are independent from each other.

* * * * *